(12) United States Patent
Kaiju et al.

(10) Patent No.: US 7,275,166 B2
(45) Date of Patent: Sep. 25, 2007

(54) POWER SAVING CONTROL SYSTEM AND POWER SAVING CONTROL METHOD

(75) Inventors: Yoshihiko Kaiju, Kawasaki (JP); Shoichi Yoshida, Kawasaki (JP); Yoshitaka Murakawa, Kawasaki (JP); Akio Futamata, Kawasaki (JP); Katsuyoshi Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 158 days.

(21) Appl. No.: 11/089,137

(22) Filed: Mar. 24, 2005

(65) Prior Publication Data

US 2005/0273638 A1    Dec. 8, 2005

Related U.S. Application Data

(63) Continuation of application No. PCT/JP02/12275, filed on Nov. 25, 2002.

(51) Int. Cl.
*G00F 1/26* (2006.01)

(52) U.S. Cl. ......................... 713/320; 360/75

(58) Field of Classification Search ................ 713/320; 360/75
See application file for complete search history.

(56) References Cited

U.S. PATENT DOCUMENTS

| | | | | |
|---|---|---|---|---|
| 5,452,277 A | * | 9/1995 | Bajorek et al. | 369/53.18 |
| 5,544,138 A | * | 8/1996 | Bajorek et al. | 369/53.42 |
| 5,682,273 A | * | 10/1997 | Hetzler | 360/75 |
| 6,553,501 B1 | * | 4/2003 | Yokoe | 713/320 |
| 6,583,947 B1 | * | 6/2003 | Hakamata et al. | 360/69 |
| 6,704,877 B2 | * | 3/2004 | Cline et al. | 713/320 |
| 6,826,005 B2 | | 11/2004 | Hakamata et al. | |
| 7,075,744 B2 | * | 7/2006 | Cumpson et al. | 360/73.03 |
| 2001/0044332 A1 | | 11/2001 | Yamada et al. | |
| 2004/0015731 A1 | * | 1/2004 | Chu et al. | 713/300 |

FOREIGN PATENT DOCUMENTS

| | | |
|---|---|---|
| EP | 568237 | 11/1993 |
| JP | 6-138983 | 5/1994 |
| JP | 8-102132 | 4/1996 |
| JP | 11-73710 | 3/1999 |
| JP | 2000-66844 | 3/2000 |
| JP | 2000-89984 | 3/2000 |
| JP | 2000-215002 | 8/2000 |
| JP | 2000-250726 | 9/2000 |
| JP | 2000-293314 | 10/2000 |
| JP | 2001-93220 | 4/2001 |
| JP | 2001-331244 | 11/2001 |
| JP | 2002-221958 | 8/2002 |

* cited by examiner

*Primary Examiner*—Thomas Lee
*Assistant Examiner*—Vincent T Tran
(74) *Attorney, Agent, or Firm*—Staas & Halsey LLP (57) ABSTRACT

Provided is a power saving control method and system for data storage devices or electrical equipment. Herein, data items are divided into groups according to required response times or access frequencies. The groups of data items are allocated to data storage devices or pieces of electrical equipment. A data storage device or electrical equipment to which data that may be accessed using a long response time at a low access frequency is set to a power-saving mode of a higher level. Consequently, the data storage devices or pieces of electrical equipment are provided with power-saving features of different levels. Eventually, energy saving can be achieved more efficiently.

2 Claims, 8 Drawing Sheets

| HDD | #1 | #2 | #3 | #4 |
|---|---|---|---|---|
| REQUEST RESPONSE SPEED (SEC) | LOWER THAN 0.1 | EQUAL TO OR HIGHER THAN 0.1 AND LOWER THAN 1 | EQUAL TO OR HIGHER THAN 1 AND LOWER THAN 10 | EQUAL TO HIGHER THAN 10 |

| HDD | #1 | #2 | #3 | #4 |
|---|---|---|---|---|
| REQUEST RESPONSE SPEED (SEC) | LOWER THAN 0.1 | EQUAL TO OR HIGHER THAN 0.1 AND LOWER THAN 1 | EQUAL TO OR HIGHER THAN 1 AND LOWER THAN 10 | EQUAL TO HIGHER THAN 10 |

Fig.4

| #4 HDD | #4A | #4B | #4C |
|---|---|---|---|
| PREDEFINED ACCESS FREQUENCY | LOWER THAN 1000 SEC | EQUAL TO OR HIGHER THAN 1000 SEC AND LOWER THAN 10000 SEC | EQUAL TO OR HIGHER THAN 10000 SEC |

Fig.5

| STATE | NORMAL STATE | TIME OF ACTIVATION |
|---|---|---|
| POWER CONSUMPTION (W) | 5 | 10 |

Fig.6

|  | ENERGY-SAVING MODE 0 | ENERGY-SAVING MODE 1 | ENERGY-SAVING MODE 2 | ENERGY-SAVING MODE 3 |
|---|---|---|---|---|
| POWER CONSUMPTION (W) | 5 | 4.9 | 4 | 0.1 |
| ACTIVATION TIME (SEC) | 0 | 0.3 | 3 | 30 |

|  | # 1 | # 2 | # 3 | # 4 |
|---|---|---|---|---|
| ENERGY-SAVING MODE IN RELATED ART | 0 | 0 | 0 | 0 |
| ENERGY-SAVING MODE IN FIRST EMBODIMENT | 0 | 0 | 1 | 2 |

Fig.10

|  | #4A | #4B | #4C |
|---|---|---|---|
| ENERGY-SAVING MODE IN FIRST EMBODIMENT | 2 | 2 | 2 |
| ENERGY-SAVING MODE IN SECOND EMBODIMENT | 2 | 2 | 3 |

Fig.11

POWER SAVING CONTROL SYSTEM AND POWER SAVING CONTROL METHOD

CROSS-REFERENCE TO RELATED APPLICATIONS

This application is a continuation application of PCT/JP02/12275 filed on Nov. 25, 2002, the contents being incorporated herein by reference.

BACKGROUND OF THE INVENTION

1. Field of the Invention

The present invention relates to a power saving control system and a power saving control method that are adapted to a system comprising a plurality of electric devices for which different response speeds are required. More particularly, the present invention is concerned with a power saving control system and a power saving control method that are adapted to a system comprising a plurality of data storage devices.

2. Description of the Related Art

Along with the recent rapid innovation of information communication technologies, the information society has rapidly advanced and the amount of information to be handled has greatly increased. As a result of the popularization of the Internet, the amount of information to be handled, especially online, has drastically increased. Accordingly, the number of data server systems is markedly increasing. Many data server systems are more or less required to handle data in real time while they are in operation.

Many data storage devices currently adapted to the data servers are magnetic disk drives. An increase in the number of magnetic disk drives, or more particularly, an increase in the number of data storage devices capable of handling data online in real time leads to an increase in a power consumption. Needless to say, an energy-saving technology for saving the energy consumed by an individual device is making progress, and more and more devices are being provided with a feature supporting a so-called power saving mode. However, the increase in the amount of data a current information society is required to handle is overwhelming the progress made by the energy saving technology. Moreover, a data storage device is frequently accessed due to an increase in the need for quick response. Therefore, an energy saving mode cannot be utilized fully effectively. Accordingly, the present invention is intended to provide a means for not only meeting a requirement for a fast response by an online data storage device but also to utilize an energy saving feature.

[Patent Document 1] Japanese Unexamined Patent Application Publication No. 2001-93220

[Patent Document 2] Japanese Unexamined Patent Application Publication No. 2000-215002

[Patent Document 3] Japanese Unexamined Patent Application Publication No. 11-73710

In general, a plurality of data storage devices is employed in the storage of a large amount of online real-time information. This is because one data storage device cannot meet a performance-related requirement. Many data items are allocated to the data storage devices and stored therein. At this time, the data items are often classified in terms of data management with no consideration taken into the properties thereof, or especially, the access frequencies or response times required therefor. The classifying method poses no problem as long as an amount of online real-time data is relatively small. However, when the number of data storage devices is increased due to an increase in an amount of data, a power consumption required for waiting data to be received or to be transferred expands enormously. The underlying problem of the classifying method has come to light from the viewpoint of environmental protection.

As one solution to the problem, a method for controlling data storage devices has been proposed in the Japanese Unexamined Patent Application Publication No. 2001-93220.

Figure 11:
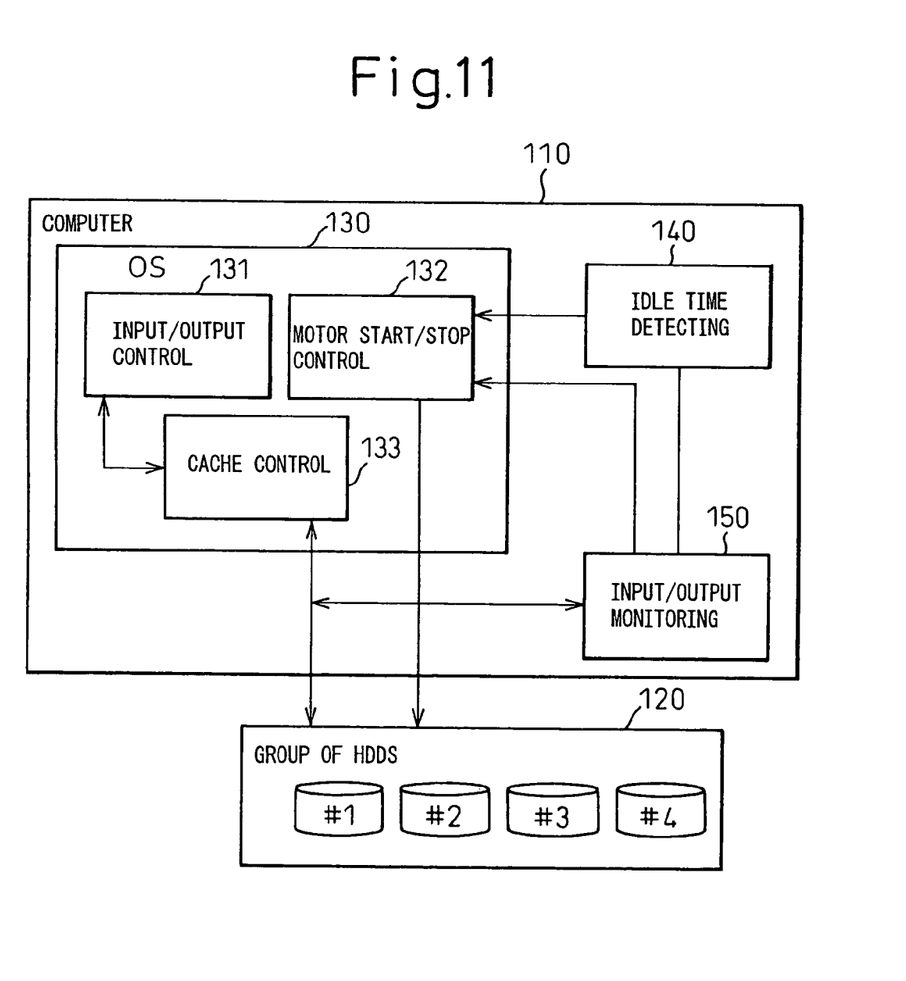
FIG. 11 is a block diagram showing an example of a conventional power saving control system.

FIG. 11 is a block diagram showing the configuration of a data storage system disclosed in the foregoing patent publication. Referring to the drawing, the data storage system comprises a computer 110 and a HDD group 120 including first to fourth hard disk drives (HDD) serving as external data storage devices.

The computer 110 comprises an operating system (OS) 130, an idle time detecting means 140, and an input/output monitoring means 150.

The OS 130 comprises an input/output control means 131, a motor start/stop control means 132, and a cache control means 133.

The input/output control means 131 and cache control means 133 control transfer of data to or from the HDDs, which belong to the group 120 of HDDs, according to predefined access frequencies.

The motor start/stop control means 132 controls starting or stopping of a motor serving as an HDD driver.

The idle time detecting means 140 detects an idle time during which the group 120 of HDDs does not respond to an input signal.

The input/output monitoring means 150 monitors transfer of data from the OS 130 to the HDDs, and records the number of times, by which data is transferred to or from each HDD during a unit time, for each data at every time of measurement.

When the system shown in FIG. 11 is in operation, data whose access frequency is high is temporarily moved to an HDD whose access frequency is detected to be high by the input/output monitoring means 150. This is intended to create an HDD whose access frequency is low. Furthermore, a time during which the HDDs are not accessed at all is measured by the idle time detecting means 140. If the length of the time is equal to or larger than a predetermined value, the motor start/stop control means 132 extends control to completely stop a spindle motor associated with each HDD. Thus, unnecessary consumption of power by the HDDs is suppressed.

However, if data requires fast response though it is accessed less frequently, in this case, when only an access frequency is taken into consideration, as the data is stored in an HDD whose access frequency is low, a long time is required for starting the spindle motor. This poses a problem in that the data cannot be accessed quickly.

The invention described in the above patent publication takes only an access frequency into consideration. There is data whose access frequency is low but which is required to be accessed quickly. When the data is moved to and stored in an HDD whose spindle motor is not rotating, an action cannot be performed within a required response time. Moreover, it is hard to automatically identify a request for quick response through measurement performed by a data storage device. Even when the contents of the patent publication describing an access frequency are broadly interpreted, the problem cannot be solved.

SUMMARY OF THE INVENTION

Accordingly, an object of the present invention is to provide a power saving control method for effectively saving energy while meeting a requirement for quick response to the greatest possible extent.

In order to accomplish the above object, a power saving control method in accordance with the first aspect of the present invention is a method comprising the steps of: classifying a plurality of data storage devices according to required response speeds at which they can respond to an access request; and setting the data storage devices to power-saving modes of levels associated with the required response speeds.

According to the second aspect of the present invention, there is provided a power saving control method identical to the power saving control method in accordance with the first aspect except that the power saving method further comprises a step of further classifying the data storage devices according to required levels of access frequencies and a step of setting the data storage devices to power-saving modes of levels associated with the required levels of data access frequencies.

According to the third aspect of the present invention, there is provided a power saving control method identical to the power saving control method in accordance with the second aspect except that, when the required level of an access frequency of data stored in a data storage device is changed to be equal to or larger than a predetermined value, the data is moved to a data storage device for which the predetermined required level of an access frequency is predefined.

According to another aspect of the present invention, there is provided a power saving control system in which any of the methods in accordance with the first to third aspects is implemented.

According to another aspect of the present invention, there are provided a power saving control method for electrical equipment comprising the steps of: classifying a plurality of pieces of electrical equipment according to required response speeds at which they can respond to an access request; and setting the pieces of electrical equipment to power-saving modes of levels associated with the required response speeds, and a power saving control system in which the power saving control method is implemented.

To be more specific, according to the first aspect, a response speed required for data to be handled is specified as, for example, a data attribute. The data attribute of the data is referenced in order to store data, for which a response speed equivalent to the data attribute is required, in the same data storage device, for example, the same HDD. Thereafter, energy-saving modes of data storage devices such as HDDs are determined based on the attributes of stored data items such as response speeds required for the data items. Specifically, no energy-saving mode is determined for an HDD required to respond most quickly. An advanced energy-saving mode in which the rotation of a disk is completely stopped is determined for an HDD permitted to have the longest response time.

Compared with the conventional method in which data is stored in all HDDs irrespective of response times, and almost all the HDDs operate in steady states all the time so as to meet a request for quick response, the method in accordance with the present invention can set an HDD, which should meet a request for slow response, to an advanced energy-saving mode. Consequently, a system can highly effectively save energy as a whole.

If the method in accordance with the present invention is not adopted but an access frequency alone is taken into consideration as it conventionally is and individual HDDs are set to an advanced energy-saving mode, when data stored in any of the HDDs is accessed, a response time of several tens of seconds may be required, and any requirement for a system or a customer's need cannot be satisfied. According to the first aspect of the present invention, as an HDD in which data that requires a quick response is stored is set to a low-level energy-saving mode, a request for quick response can be met.

The second aspect of the present invention has, in addition to the constituent features of the first aspect, a constituent feature that an access frequency of data is also taken into consideration. Consequently, an HDD in which data is stored is determined based on a response speed at which data should be accessed and the access frequency of the data.

When no consideration is taken into a response speed, as is conventional, although data does not require quick response, if the access frequency of the data is high, an HDD is set to a high-level energy-saving mode but cannot be set to a low-level energy-saving mode. Consequently, the effect of saving the energy to be consumed by a system deteriorates.

In contrast, according to the second aspect of the present invention, not only an access frequency but also a response speed is taken into consideration at the time of storing data in an HDD. An energy-saving effect improves.

According to the third aspect of the present invention, there is provided a method that is identical to the method in accordance with the second aspect except that, even when a property of data is changed, an optimal system can be maintained. Namely, when a property of an access frequency of data measured by the system is different from an attribute of a data storage device in which the data is stored, the data is moved to a storage device for which the access frequency is predefined. Thus, an energy-saving effect is sustained.

BRIEF DESCRIPTION OF THE DRAWINGS

The foregoing object and features of the present invention will be apparent from embodiments described in reference with the following appended drawings.

DESCRIPTION OF THE PREFERRED EMBODIMENTS

Power saving control systems and power saving control methods in accordance with the embodiments of the present invention that are adapted to an environment including a plurality of data storage devices will be described below with reference to the drawings.

Figure 1:
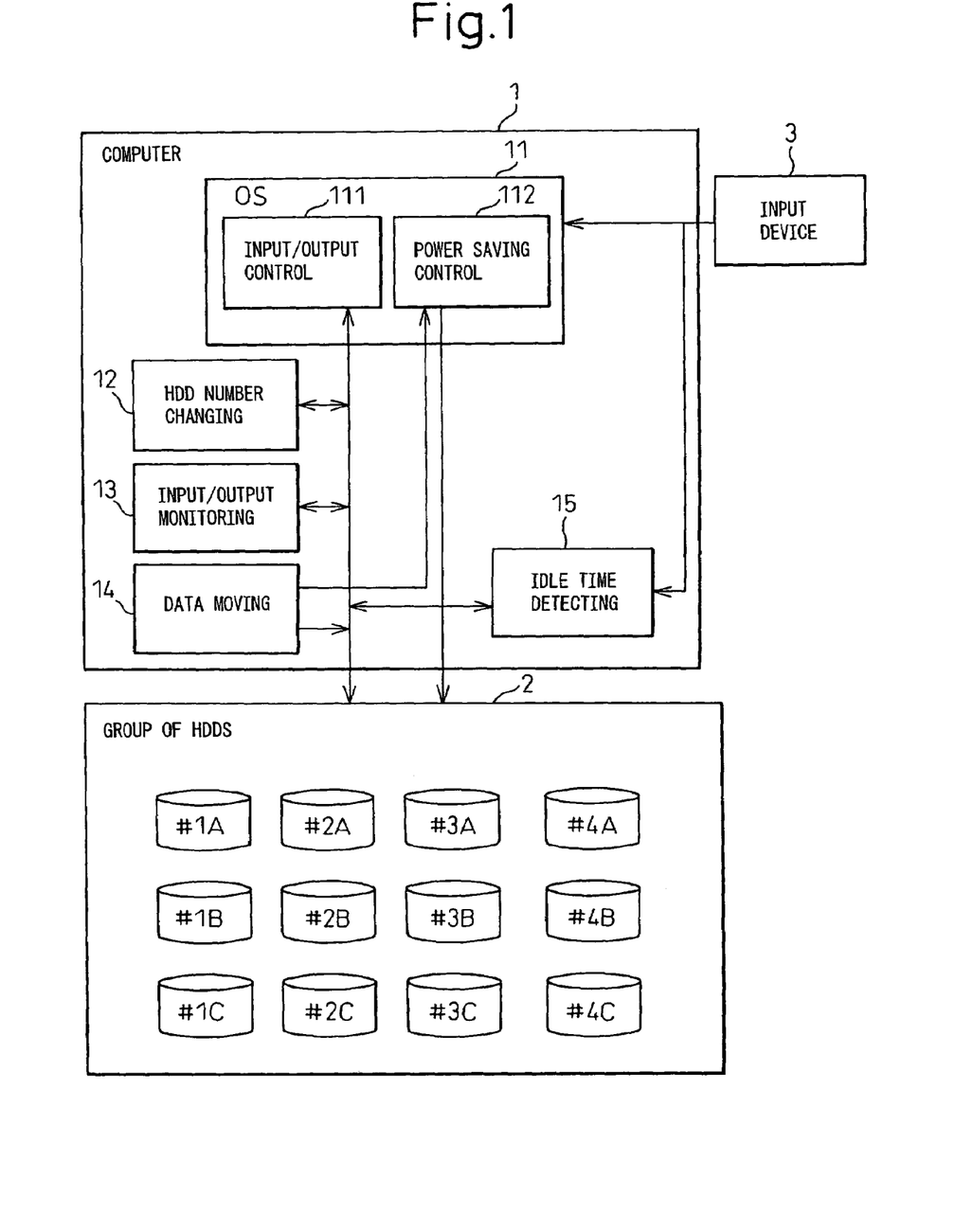
FIG. 1 is a block diagram showing a power saving control system in accordance with the first and second embodiments of the present invention.

FIG. 1 is a block diagram of a power saving control system in accordance with the first and second embodiments of the present invention. The power saving control system comprises a computer (or a controller) 1 that performs actions under the control of a program, a group 2 of HDDs including twelve HDDs (HDDs 1A to 4A, HDDs 1B to 4B, and HDDs 1C to 4C) serving as external data storage devices, and an input device 3 for use in entering an idle time, during which an input signal is not responded to, or data. The input device 3 is realized with a keyboard or an automated teller machine (ATM) terminal.

The computer 1 comprises an operating system (OS) 11, an HDD number changing means 12, an input/output monitoring means 13, a data moving means 14, and an idle time detecting means 15.

The OS 11 comprises an input/output control means 111 and a power saving control means 112.

The input/output control means 111 included in the first embodiment of the present invention extends control so that data will be transferred to or from the HDDs according to required response speeds. The input/output control means 111 included in the second embodiment of the present invention extends control so that data will be transferred to or from the HDDs according to the required response speeds and predefined access frequencies.

The power saving control means 112 extends control so as to save powers to be consumed by the plurality of HDDs belonging to the group 2 of HDDs. The control to be extended for saving power is, for example, to start or stop a motor serving as a driver for driving each HDD.

The HDD number changing means 12 changes a number of an HDD, to or from which data is transferred, into a number of an HDD to which data is moved by the data moving means 14.

The input/output monitoring means 13 monitors transfer of data to or from the HDDs via the input/output control means 111 included in the OS 11, and records the numbers of times, by which data is transferred to or from the respective HDDs during a unit time, at every time of measurement or data transfer.

The data moving means 14 records the numbers of the HDDs to which respective data items are stored. According to the second embodiment, when data is stored in an HDD which is included in the group 2 of HDDs and whose predefined required level of an access frequency is different from a measured required level of an access frequency of the data, the data moving means 14 moves the data to an HDD for which a required level of an access frequency is predefined to fall within a range including the measured value.

The idle time detecting means 15 included in the second embodiment of the present invention detects an idle time during which an input signal is not responded to and which is transferred from the input device 3 to the group 2 of HDDs.

Figure 2:
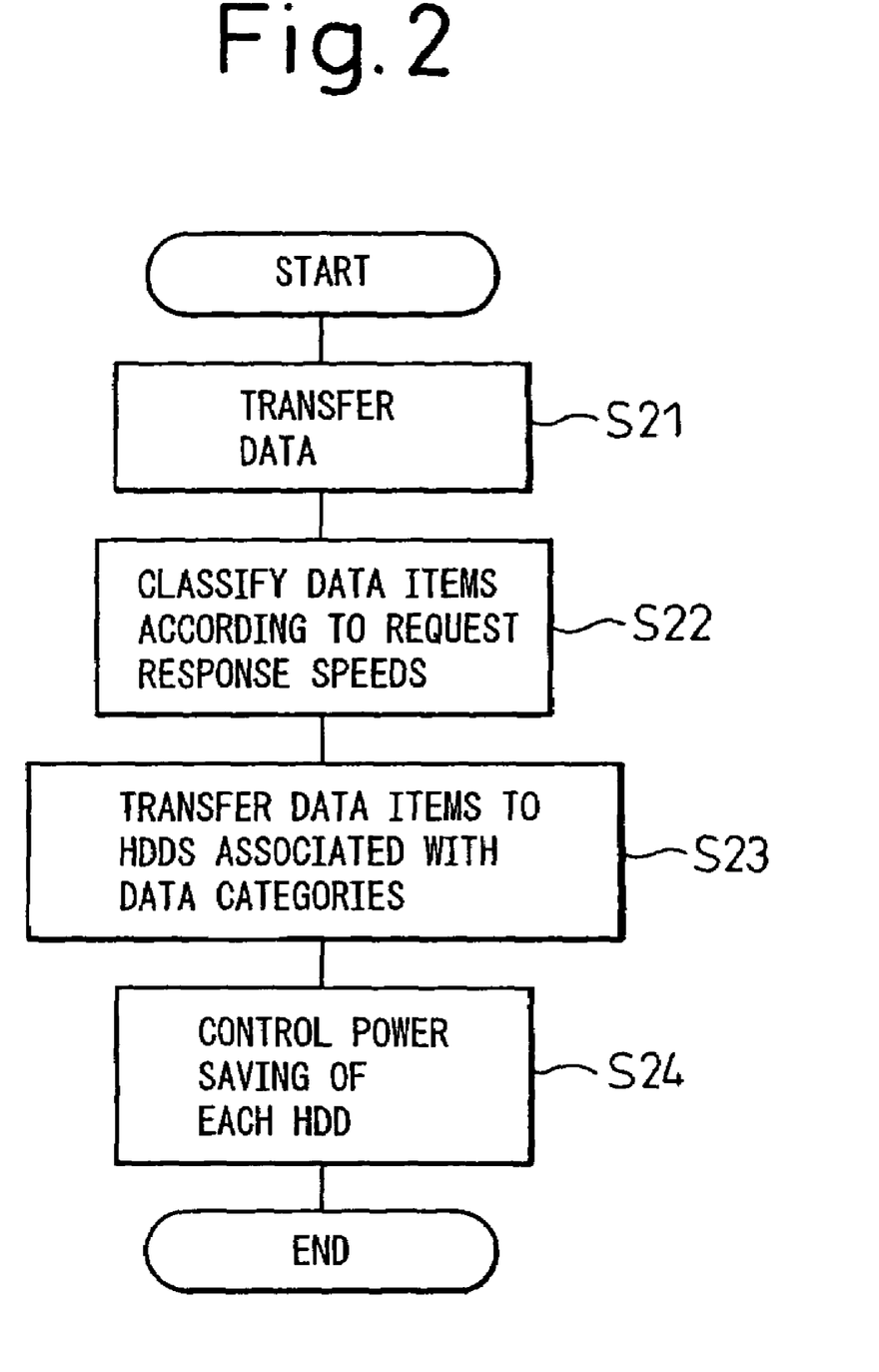
FIG. 2 is a flowchart describing the outline of actions to be performed in the power saving control system shown in FIG. 1.

FIG. 2 is a flowchart outlining actions to be performed in the control system shown in FIG. 1. Referring to FIG. 2, the input device 3 transfers data to the computer 1 at step S21.

At step S22, data items are classified according to required response speeds. According to the first embodiment, the input/output control means 111 references the attributes specified in the respective data items so as to classify the data items according to the required response speeds. According to the second embodiment, the input/output control means 111, input/output monitoring means 13, and idle time detecting means 15 reference the attributes specified in the data items so as to classify the data items according to the required response speeds and also classify them according to required levels of access frequencies in the same manner as they do according to the related art. Moreover, according to the third embodiment, as described later, not only the same actions as the actions performed in the second embodiment are performed but also the data moving means 14 moves data from one HDD to another, if necessary.

Thereafter, at step S23, the data items are transferred to the HDDs according to their categories.

At step S24, the power savings of the HDDs are controlled independently of one another.

Consequently, the power savings of the HDDs are controlled according to the required response speeds or according to the required response speeds and required levels of access frequencies.

Next, referring to FIG. 3 to FIG. 6, the actions to be performed in the entire power saving control system having the foregoing components will be described using concrete numerical values.

Figure 3:
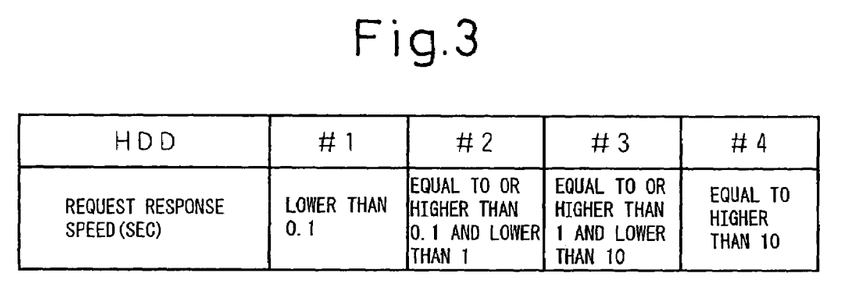
FIG. 3 is a table presenting the categories of required response speeds of HDDs shown in FIG. 1.

FIG. 3 is a table presenting the categories of required response speeds of the HDDs shown in FIG. 1. First, the categories of required response speeds required for data items to be stored in the first to fourth groups of HDDs are predefined under the conditions that, as seen from FIG. 3, HDDs whose required response speeds fall below 0.1 sec are classified into the first group, HDDs whose required response speeds are equal to or higher than 0.1 sec and fall below 1 sec are classified into the second group, HDDs whose required response speeds are equal to or higher than 1 sec and falls below 10 sec are classified into the third group, and HDDs whose required response speeds are equal to or higher than 10 sec are classified into the fourth group.

Figure 4:
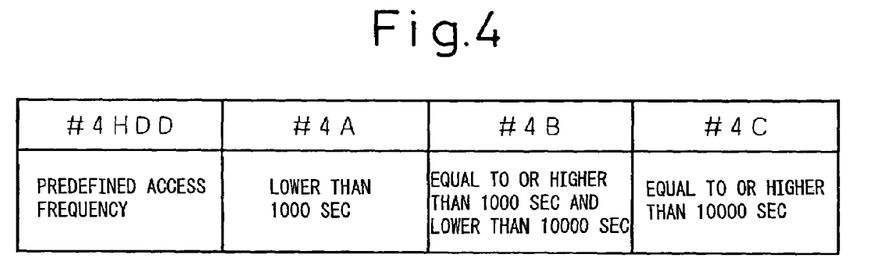
FIG. 4 is a table presenting the categories of predefined access frequencies of HDDs shown in FIG. 1.

FIG. 4 is a table presenting the categories of predefined access frequencies of the HDDs shown in FIG. 1. As seen from FIG. 4, the predefined access frequency of the HDD 4A belonging to the fourth group of HDDs falls below 1,000 sec, the predefined access frequency of the HDD 4B belonging thereto is equal to or higher than 1,000 sec and falls below 10,000 sec, and the predefined access frequency of the HDD 4C belonging thereto is equal to or higher than 10,000 sec.

Figure 5:
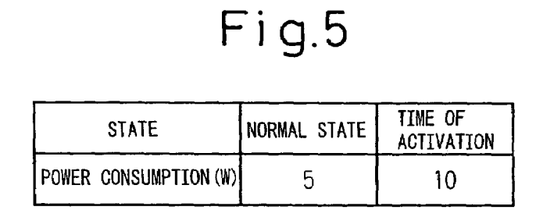
FIG. 5 is a table presenting power consumptions in relation to states of the HDDs shown in FIG. 1.

FIG. 5 is a table presenting power consumptions required in respective states of the HDDs shown in FIG. 1. As seen from FIG. 5, in this example, the power consumption of the HDDs in a normal state is 5 W, and the power consumption thereof at the time of activation is 10 W.

Figure 6:
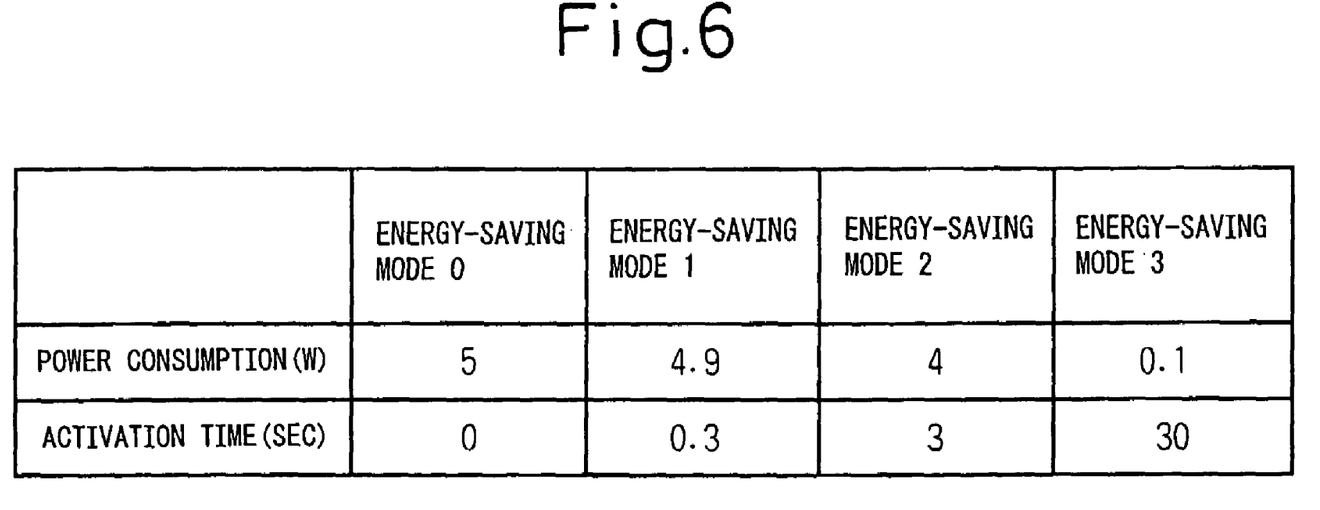
FIG. 6 is a table presenting the categories of energy-saving modes of the HDDs shown in FIG. 1.

FIG. 6 is a table presenting the categories of energy-saving modes of the HDDs shown in FIG. 1. In this example, the power consumptions and activation times associated with the energy-saving modes 1 to 3 are predefined as 4.9 w and 0.3 sec, 4 W and 3 sec, and 0.1 W and 30 sec respectively. For convenience' sake, a state in which a power consumption of 5 W is required shall be predefined as the energy-saving mode 0.

Figure 7:
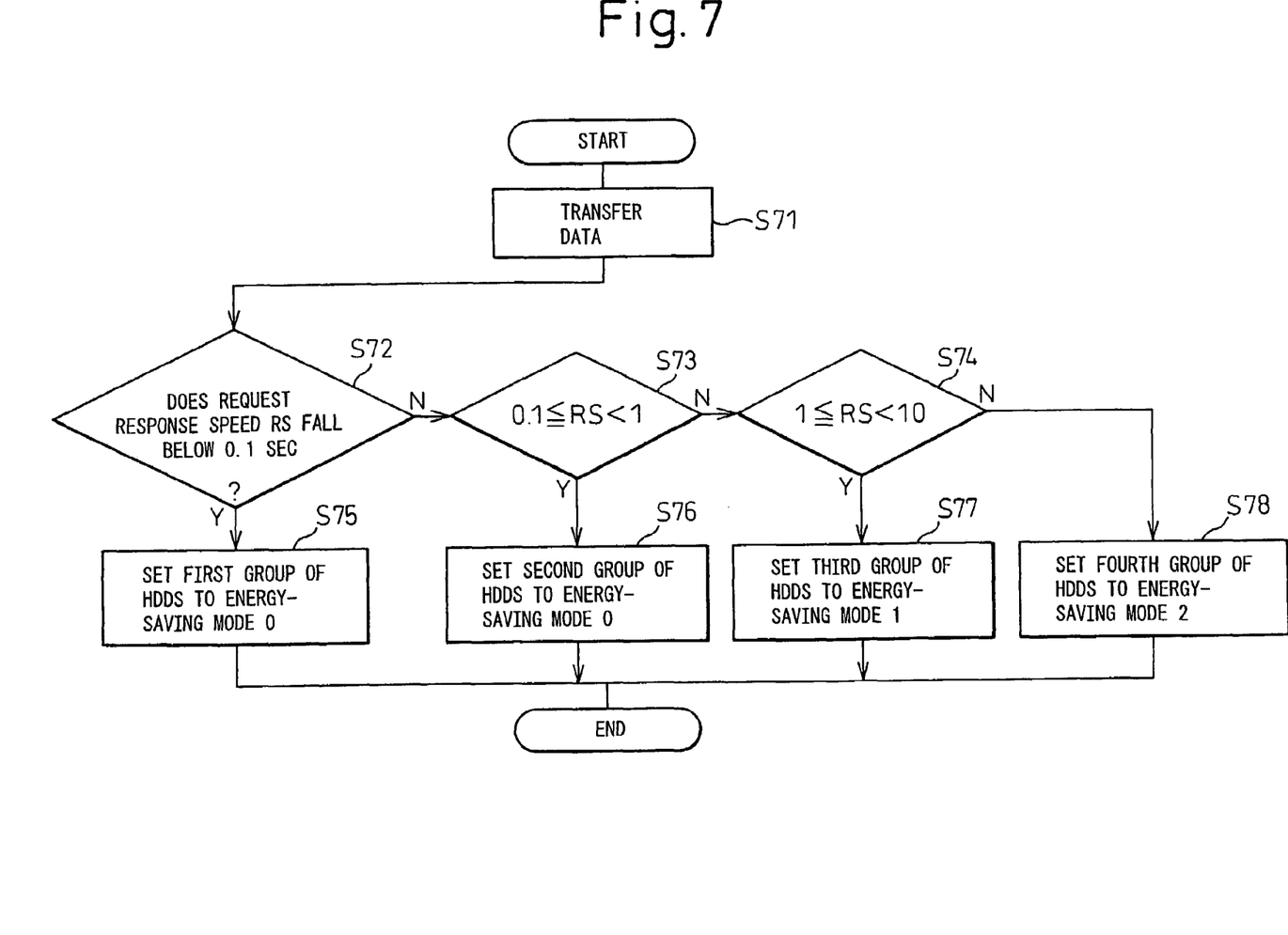
FIG. 7 is a flowchart describing a power-saving control method in accordance with the first embodiment of the present invention.

FIG. 7 is a flowchart describing a power saving control method in accordance with the first embodiment of the present invention. Referring to FIG. 7, data is transferred from the input device 3 to the computer 1 at step S71. At step S72, the input/output control means 111 checks the received data to see if a required response speed RS specified in the data falls below 0.1 sec. If the required response speed RS does not fall below 0.1 sec, whether the required response speed RS is equal to or higher than 0.1 sec and falls below 1 sec is verified at step S73. If the verification is made in the negative, whether the required response speed RS is equal to or higher than 1 sec and falls below 10 sec is verified at step S74.

If the required response speed RS is found to fall below 0.1 sec at step S72, the data is transferred to the first group of HDDs at step S75. The HDDs are, as listed in FIG. 8, set to the energy-saving mode 0.

If the required response speed RS is found to be equal to or higher than 0.1 sec and to fall below 1 sec at step S73, the data is transferred to the second group of HDDs at step S76. The HDDs are, as listed in FIG. 8, set to the energy-saving mode 0.

If the required response speed RS is found to be equal to or higher than 1 sec and fall below 10 sec at step S74, the data is transferred to the third group of HDDs at step S77. The HDDs are, as listed in FIG. 8, set to the energy-saving mode 1.

If the required response speed RS is found to be equal to or higher than 10 sec at step S74, the data is transferred to the fourth group of HDDs at step S78. The HDDs are, as listed in FIG. 8, set to the energy-saving mode 2.

As mentioned above, according to the first embodiment of the present invention, data transferred to or from the computer 10 using the input device 3 and an output device (not shown) is controlled based on a required response speed by the input/output control means 111. The data is then transferred to or from the HDDs that belong to the group 2 of HDDs and are associated with the required response speed.

Conventionally, when data requiring a response speed of 0.1 sec or lower is stored at random in HDDs, as the activation times associated with the energy-saving modes 1, 2, and 3 are 0.3 sec, 3 sec, and 30 sec respectively that are longer than the required response speed of 0.1 sec, the HDDs cannot be set to any of the energy-saving modes 1 to 3 but can be set to only the energy-saving mode 0. Consequently, a transfer of data, for which a low response speed is required, needs a power consumption of 5 W.

In contrast, according to the first embodiment of the present invention, data for which a response speed that is equal to or higher than 1 sec and falls below 10 sec is required is, as listed in FIG. 3, transferred to the third group of HDDs. The activation time of 0.3 sec associated with the energy-saving mode 1 as listed in FIG. 6 is equal to or shorter than the required response speed. Consequently, the third group of HDDs can be set to the energy-saving mode 1. Likewise, the fourth group of HDDs whose required response speed is 10 sec or higher can be set to the energy-saving mode 2 associated with the activation time of 3 sec that is shorter than the required response speed.

Figure 8:
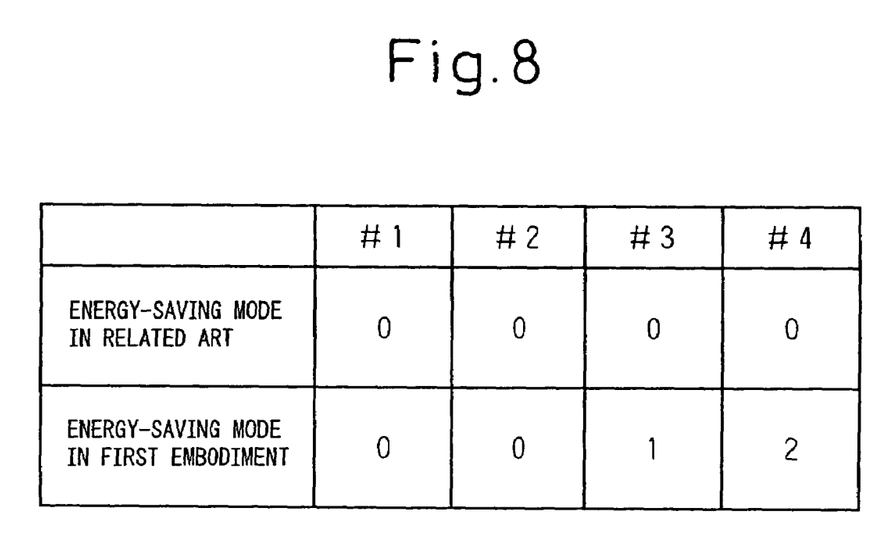
FIG. 8 is a table presenting a difference between conventional energy-saving modes and energy-saving modes provided by the first embodiment.

FIG. 8 is a table presenting a difference between energy-saving modes provided by the related art and those provided by the first embodiment of the present invention. As seen from FIG. 8, according to the related art, all the groups of HDDs are set to the energy-saving mode 0. According to the first embodiment of the present invention, the third and fourth groups of HDDs are set to the energy-saving modes 1 and 2 respectively. Thus, energy saving can be achieved.

Next, the second embodiment of the present invention will be described below.

Figure 9:
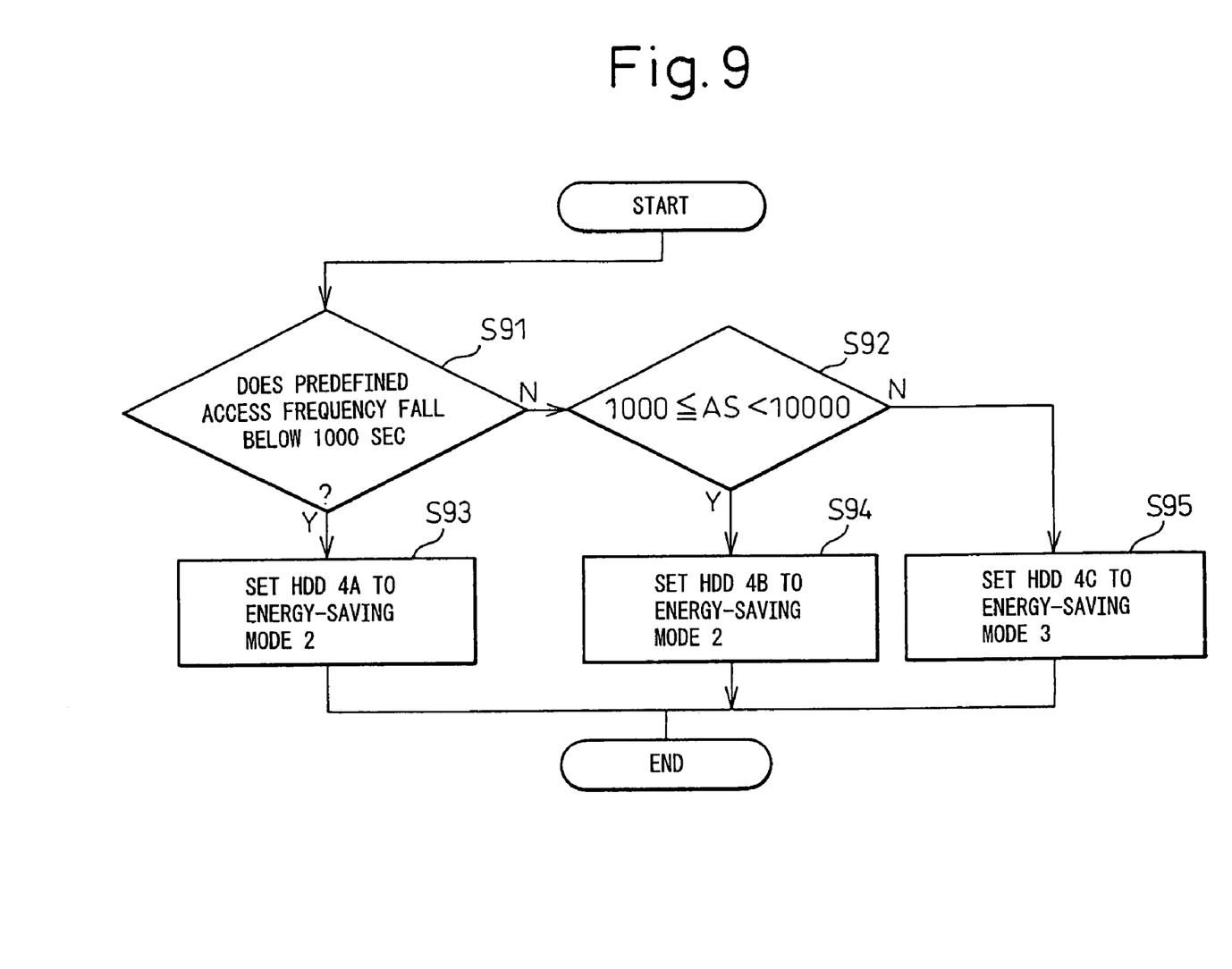
FIG. 9 is a flowchart describing a power saving control method in accordance with the second embodiment of the present invention.

FIG. 9 is a flowchart describing a power saving control method in accordance with the second embodiment of the present invention. Referring to FIG. 9, after data is transferred at step S71 described in FIG. 7, or after any of steps S75 to S78 is completed, a predefined access frequency AS is checked at step S91 to see if it falls below 1,000 sec. If the predefined access frequency AS does not fall below 1,000 sec, whether it is equal to or higher than 1,000 sec and falls below 10,000 sec is verified at step S92.

If the predefined access frequency AS is found to fall below 1,000 sec at step S91, the data is transferred to the HDD 4A at step S93, and the HDD is, as listed in FIG. 10, set to the energy-saving mode 2.

If the predefined access frequency AS is found to be equal to or higher than 1,000 sec and fall below 10,000 sec at step S92, the data is transferred to the HDD 4B at step S94. The HDD is, as listed in FIG. 10, set to the energy-saving mode 2.

If the predefined access frequency AS is found to be equal to or higher than 10,000 sec at step S92, the data is transferred to the HDD 4C at step S95. The HDD is, as listed in FIG. 10, set to the energy-saving mode 3.

Figure 10:
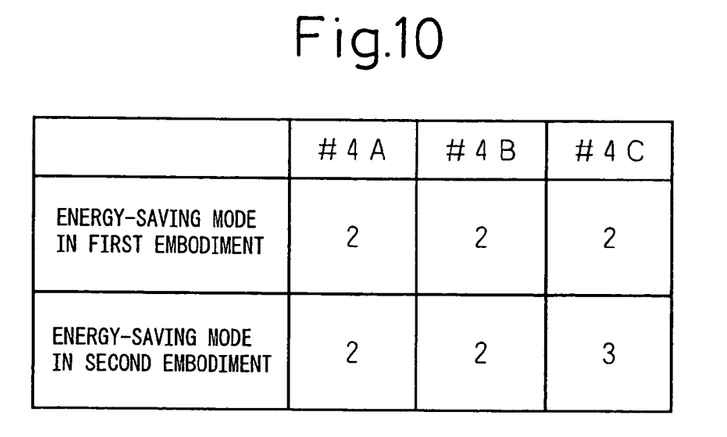
FIG. 10 is a table presenting a difference between the energy-saving modes provided by the first embodiment of he present invention and those provided by the second embodiment thereof.

FIG. 10 is a table presenting a difference between the energy-saving modes provided by the first embodiment of the present invention and those provided by the second embodiment thereof. According to the second embodiment of the present invention, transfer of data to an HDD is controlled using the input/output means 111, input/output monitoring means 13, and idle time detecting means 15 according to the required response speed and the predefined access frequency.

For example, assume that three kinds of jobs requiring access to an HDD at a required response speed of 20 sec and at access frequencies of 200 sec, 2,000 sec, and 20,000 sec respectively are executed concurrently. According to the first embodiment, when the required response speed is 20 sec, all the HDDs 4A to 4C are, as listed in the upper part of the table of FIG. 10, set to the energy-saving mode 2 (FIG. 6) in association with which the activation time of 3 sec shorter than the required response speed is defined.

In contrast, according to the second embodiment of the present invention, when the HDD 4C is not accessed for a predetermined idle time or longer, the HDD is, as listed in the lower part of FIG. 10, set to the energy-saving mode 3. The idea of setting the HDD 4C this way will be described below.

The input/output monitoring means 113 measures an access frequency at which the fourth group of HDDs is accessed in response to an input/output job. As far as the three kinds of jobs requiring access to an HDD at the above access frequencies are concerned, the number of times by which data is accessed at intervals of 200 sec during 20,000 sec is 100. The number of times by which data is accessed at intervals of 2,000 sec during 20,000 sec is 10. The number of times by which data is accessed at intervals of 20,000 sec during 20,000 sec is 1. The total number of times by which data is accessed in response to the three kinds of jobs comes to 111 (=100+10+1).

The degree to which a required response speed is attained with the HDD 4C set to the energy-saving mode 2 or 3, and the effect of energy saving will be calculated below.

When the fourth group of HDDs is set to the energy-saving mode 2, as the activation time is 3 sec or shorter than the required response speed of 20 sec. The degree to which the required response speed is attained is 10%. Moreover, the power consumption required in a normal state by each of the three kinds of jobs is 4 W, and the power consumption required at the time of activation is 10 W. The activation time is 3 sec, and the number of times of access is 111. Therefore, the total power consumption in the normal state comes to 240,000 wattseconds (=3*4 W*20,000 sec). The total power consumption at the time of activation comes to 9,990 wattseconds (=3*3 sec*10 W*1). In total, 249,990 wattseconds is required (on the assumption that a processing time is short).

On the other hand, assume that the HDDs 4A and 4B are set to the energy-saving mode 2 and the HDD 4C alone is set to the energy-saving mode 3. In this case, the activation time required for the HDD 4C is 30 sec or longer than the required response speed of 20 sec. Therefore, the required response speed is not attained, and the degree to which the required response speed is attained is calculated as 110/111=99.1%. Moreover, the power consumption required in a normal state by the HDD 4A or 4B is 160,000 wattseconds (=2*4 W*2,000 sec), and the power consumption required at the time of activation is 6,600 wattseconds (=2*3 sec*10 W*110). Furthermore, the power consumption required for the HDD 4C in the normal state is 2,000 wattseconds (=1*0.1 W*2,000 sec), and the power consumption required at the time of activation is 300 wattseconds (1*30 sec*10 W*1). In total, 168,900 wattseconds is required. Thus, compared with when all the HDDs are set to the energy-saving mode 2, the power consumption can be saved by as much as 32%. As demonstrated through the above calculation, when the degree to which a required response speed is attained decreases, the rate indicating the effect of power saving increases. In this case, if a value measured by the idle time detecting means 16 is equal to or larger than a pre-defined value, an HDD whose access frequency is low is set to a high-level energy-saving mode. Thus, power saving can be achieved.

Next, the third embodiment of the present invention will be described below.

Talking of a required response speed and a predefined access frequency employed in the second embodiment, when the required response speed is changed, a user should merely modify a determined response speed. However, when an HDD is accessed, an access frequency is not always taken into consideration in order to transfer data. Therefore, an access frequency may be different from a set value in practice. According to the third embodiment of the present invention, if an access frequency classified by the control system of the second embodiment becomes different from a value measured by the input/output monitoring means 13, the data moving means 14 moves data from one HDD to another for which a predetermined access frequency is predefined. The HDD is then registered in the HDD changing means 12. Owing to the processing, energy saving can be controlled more finely and accurately.

Methods for controlling energy-saving modes include a method using the computer (or controller) 10 and a method of specifying energy-saving modes in the group 2 of HDDs.

In the aforesaid embodiments, required response speeds at which HDDs should be accessed are classified into four categories and predefined access frequencies are classified into three categories. Even in any other case, power saving can be controlled in the same manner as the aforesaid one.

Moreover, in the aforesaid embodiments, HDDs are taken for instance. Alternatively, the embodiments can be adapted to systems each including a plurality of data storage devices such as MO disk drives or DVD disk drives, or including a plurality of pieces of electrical equipment that are accessed at different response speeds or that are accessed at difference response speeds and different access frequencies.

Incidentally, data processing software has been markedly improved, and a metadata system for appending an attribute to data has been devised. Needless to say, the present invention can be adapted to the metadata system.

As described above, according to the present invention, data items are divided into groups according to required response times or required access frequencies. The groups of data items are allocated to respective data storage devices or any other pieces of electrical equipment respectively. A data storage device or any other electrical equipment to which data for which a response time may be longer or data whose access frequency is low is allocated is set to a higher-level power-saving mode. Consequently, the data storage devices and any other pieces of electrical equipment are provided with power-saving features of various levels. Eventually, energy saving can be achieved very efficiently.

What is claimed is:

1. A power saving control method for data storage devices comprising:
   classifying a plurality of data storage devices according to required response speeds at which the plurality of data storage devices respond to an access request;
   setting the data storage devices to power-saving modes of levels associated with the required response speeds;
   classifying the data storage devices according to required levels of access frequencies; and
   setting the data storage devices to power-saving modes of levels associated with the required levels of access frequencies predefined for the data storage devices,
   wherein when the required level of an access frequency of data stored in a data storage device is changed to be equal to or larger than a predetermined value, the data is moved to another data storage device for which the predetermined required level of an access frequency is predefined.

2. A power saving control system comprising:
   a first unit classifying a plurality of data storage devices according to required response speeds at which the plurality of data storage devices respond to an access request;
   a second unit setting the data storage devices to power-saving modes at levels associated with the required response speeds;
   a third unit further classifying the data storage devices according to required levels of access frequencies;
   a fourth unit setting the data storage devices to power-saving modes of levels associated with the required levels of access frequencies predefined for the data storage devices; and
   a fifth unit, when the required level of an access frequency of data stored in a data storage device is changed to be equal to or larger than a predetermined value, moving the data to another data storage device for which the predetermined required level of an access frequency is predefined.

* * * * *